United States Patent Office 2,759,890
Patented Aug. 21, 1956

2,759,890

DRILLING FLUIDS AND METHOD OF USING SAME

Charles J. Engle, Bartlesville, Okla., assignor to Phillips Petroleum Company, a corporation of Delaware No Drawing. Application November 19, 1954,
Serial No. 470,134

11 Claims. (Cl. 252—8.5)

This invention relates to oil-base drilling fluids.

In the art of drilling wells, especially by the rotary method, there are disadvantages attendant upon the use of water-base drilling muds, particularly in drilling and coring low pressure horizons. Oil-base drilling fluids have been found quite advantageous for these and other applications. Oil-base drilling fluids weighing less than 8.3 pounds per barrel can be readily prepared, and the use of such lightweight material reduces the penetration by water of the low pressure horizon to a negligible quantity. Moreover, cores can be recovered in an "in situ" condition, and no swelling or sloughing is experienced in the presence of hydrous clays and bentonites with elimination of the resulting difficulties arising from reduced porosity or "pipe sticking."

However, oil-base drilling fluids are ordinarily disadvantageous in that they are characterized by low viscosity and have high fluid losses.

In accordance with this invention, an additive is added to the oil base which provides a drilling fluid of proper viscosity having low fluid loss without detracting from the advantages of oil base fluids, as noted above.

The additive of this invention is a mixed oleate of barium and cadmium. Surprisingly, although barium oleate, cadmium oleate and mixtures of equal parts of cadmium and barium oleates do not provide a drilling fluid having a suitable fluid loss for commercial operations, I have discovered that a mixture containing critical proportions of barium and cadmium is effective and does reduce the fluid loss to a value where commercial operations can be readily carried out. Thus, a mixed oleate, hereafter referred to as a cadmium-barium oleate, containing 15 to 17 per cent barium and 9 to 11 per cent cadmium by weight is effective for the purpose stated.

It will be appreciated, from a consideration of the molecular weights of barium, cadmium and oleic acid that all of the cadmium and barium is not present in the form of cadmium oleate or barium oleate as such. Rather, other basic cadmium oleate and barium oleate compounds are present. In these basic compounds, one valence of the cadmium or barium atom is taken up by the oleate radical and the other valence is taken up by a hydroxy group.

However, it has been found that, so long as the oleate constitutes substantially all of the anion of the salt, the requisite fluid loss is obtained where the aforementioned weight percentages of barium and cadmium are present.

A commercial preparation, identified herein as Witco No. 70, is available commercially, this compound being a mixed cadmium-barium oleate containing 10 per cent cadmium and 16 per cent barium by weight.

The amount of cadmium-barium oleate added to the oil-base varies from well to well, and the optimum amount is readily determined under any given set of conditions by withdrawing a portion of the drilling fluid and testing it with various amounts of the particular cadmium-barium oleate incorporated therein in order to determine the exact amount necessary to yield the desired properties in a drilling fluid and avoid the use of costly excessive amounts of such material. While, therefore, the amount employed is not of the essence of the invention, it can be stated that the additive will normally be incorporated in an amount within the range of 1 to 20 pounds per barrel (42 gallons) of drilling fluid and, more specifically, for most purposes within the more restricted range of 9 to 18 pounds per barrel.

The oil base to which the described additive is added can be of various types including crude oil, especially Burbank crude, diesel fuel, lubricating oil of various weights, 10W being especially suitable, and heavy and light gas oils from refinery operations. Without limiting the generality of the foregoing, it can be stated that suitable crude oils are both of the paraffinic and naphthenic types including without limitation those crude oils identified as Venezuela B–1–B, Ringwood crude oil, Cutbank Montana, Melstone No. 4, Wasatch Indian No. 5 and Houston Farms.

The drilling fluid is formed simply by adding the cadmium-barium oleate of the specified composition to the oil base. It will be understood that the drilling fluid thus formed is circulated, usually down through the drill bit and then up through the annulus between the drill pipe and walls of the hole. It contains sufficient additive that a filter cake is thereby formed on the wall of the well, without increasing the viscosity of the drilling fluid to such an extent that it cannot be circulated.

It is a feature of the invention that the drilling fluids described herein form an extremely thin filter cake, usually having a thickness of about 1/64". This is very advantageous in coring operations and in drilling wells in low pressure horizons. Moreover, the drilling fluid serves to carry cuttings derived from the drilling operation to the surface and to maintain these cuttings in suspension if rotation of the drill bit is stopped. This is accomplished by the property possessed by the present drilling fluids of setting into a gel capable of holding the cuttings in suspension when circulation of the drilling fluid is stopped. Also, the present drilling fluids have the property of reverting from the gel state to a pumpable fluid upon resumption of the drilling operation.

Another function of the drilling fluid, when utilized in a well as indicated, is to cool and lubricate the drill bit.

The following examples illustrate results obtainable with the additives of my invention in oil-base drilling fluids. The fluid loss is reported as milliliters of fluid in thirty minutes in accordance with the standard API Code 29 test, and the gel strength, in each case reported as grams, was zero initially and zero at the end of ten minutes.

*Example I*

| Run Number | Additive | Amount, pounds per barrel | Base | Fluid Loss, milliliters, in 30 minutes | Viscosity, Centipoises |
|---|---|---|---|---|---|
| 1 | Witco No. 70* | 17.5 | Burbank Crude | 3.0 | 25.0 |
| 2 | None | | do | 200 (30 sec.) | 2.0 |
| 3 | Witco No. 70* | 10.0 | Diesel Fuel | 14.0 | 4.0 |
| 4 | None | | do | 100 | 2.0 |
| 5 | 50-50 mixture of cadmium oleate and barium oleate. | 10.0 | do | 32 | 10.0 |
| 6 | Barium oleate | 10.0 | do | 32 | 6.0 |
| 7 | Cadmium oleate | 10.0 | do | 52 | 5.0 |
| 8 | Sodium oleate | 10.0 | do | 100 | 2.0 |
| 9 | Witco No. 70* | 17.5 | 10W lubricating oil | 3.5 | 49.0 |
| 10 | Calcium stearate | 17.5 | do | 90.0 | 80.0 |
| 11 | Cadmium stearate | 17.5 | do | 23.0 | 55.0 |
| 12 | Barium stearate | 17.5 | do | 65.0 | 62.0 |
| 13 | None | | do | 920 | 44.0 |

*Mixed cadmium-barium oleate containing 16% by weight barium and 10% by weight cadmium.

From the foregoing tabulation, it will be observed that the low fluid loss provided by the additives of this invention differs in kind from the fluid loss obtained with closely related materials, particularly barium oleate individually, cadmium oleate individually and a 50-50 mixture of cadmium oleate and barium oleate. Moreover, with various types of oil bases, the drilling fluids prepared with the additive of the invention exhibited a fluid loss twenty to fifty times lower than the corresponding oil without the additive, and the fluid loss was further reduced as compared with the closely related materials calcium stearate, cadmium stearate, barium stearate and sodium oleate. Thus, surprisingly, despite the relatively poor fluid loss properties obtained with closely related compounds, a drilling fluid incorporating a mixed barium-cadmium oleate containing 15 to 17 weight per cent barium and 9 to 11 per cent cadmium provided outstanding control of fluid loss and in each case provided a fluid loss of less than 15.0 which may be considered a maximum value suitable for most commercial operations.

It will be understood that other additives can be added to the drilling fluids of this invention without departing from the scope thereof. Thus, special materials are oftentimes added to drilling fluids for particular purposes, and such additional materials can be employed in conjunction with the present drilling fluids, providing a usual and conventional test of the additional additives indicates a lack of obvious adverse reactions, and such additional additives are applicable in the drilling fluids with few, if any, exceptions.

While the invention has been described in connection with present, preferred embodiments thereof, it is to be understood that this description is illustrative only and is not intended to limit the invention.

I claim:

1. As a drilling fluid, a petroleum oil suitable for use in drilling fluid and containing a sufficient amount of a mixed cadmium-barium oleate as to reduce the fluid loss due to filtration without increasing the viscosity of the drilling fluid to such an extent that it cannot be circulated, said mixed cadmium-barium oleate containing 15 to 17 per cent by weight of barium and 9 to 11 per cent by weight of cadmium.

2. The drilling fluid of claim 1 wherein the oil is crude oil.

3. A drilling fluid in accordance with claim 1 wherein the oil is a diesel fuel oil.

4. The drilling fluid of claim 1 wherein the oil is a lubricating oil.

5. The drilling fluid of claim 1 wherein said mixed cadmium-barium oleate contains 16 per cent by weight of barium and 10 per cent by weight of cadmium.

6. An oil-base drilling fluid containing 1 to 20 pounds per barrel of a mixed cadmium-barium oleate, said oleate containing 15 to 17 per cent by weight of barium and 9 to 11 per cent by weight of cadmium.

7. An oil-base drilling fluid containing 9 to 18 pounds per barrel of a mixed cadmium-barium oleate, said oleate containing 15 to 17 per cent by weight of barium and 9 to 11 per cent by weight of cadmium.

8. In a process for drilling a well, the steps which comprise circulating an oil-base drilling fluid through the drilling zone during the drilling operation and incorporating in said drilling fluid sufficient cadmium-barium oleate to form a thin filter cake on the walls of the drilling hole without increasing the viscosity of the fluid to such an extent that it cannot be pumped, said oleate containing 15 to 17 per cent by weight of barium and 9 to 11 per cent by weight of cadmium.

9. The process of claim 7 wherein the well is drilled in a low pressure horizon.

10. The process of claim 7 wherein the drilling operation includes the step of removing a core from the well.

11. As a drilling fluid, a petroleum oil base selected from the group consisting of crude oil, diesel oil, lubricating oil, and gas oil containing a sufficient amount of a mixed cadmium-barium oleate as to reduce the fluid loss due to filtration without increasing the viscosity of the drilling fluid to such an extent that it cannot be circulated, said mixed cadmium-barium oleate containing 15 to 17 per cent by weight of barium and 9 to 11 per cent by weight of cadmium.

References Cited in the file of this patent

UNITED STATES PATENTS

| | | |
|---|---|---|
| 2,239,498 | Cannon et al. | Apr. 22, 1941 |
| 2,675,352 | Dawson | Apr. 13, 1954 |